Apr. 24, 1923.

L. E. SLAUSON

METAL WHEEL

Filed Dec. 11, 1920

1,452,661

Inventor
Louis E. Slauson
By Wm. F. Beatty Atty

Patented Apr. 24, 1923.

1,452,661

UNITED STATES PATENT OFFICE.

LOUIS E. SLAUSON, OF ROCK ISLAND, ILLINOIS, ASSIGNOR TO GRID-IRON-GRIP COMPANY, OF ROCK ISLAND, ILLINOIS.

METAL WHEEL.

Application filed December 11, 1920. Serial No. 429,846.

*To all whom it may concern:*

Be it known that I, LOUIS E. SLAUSON, a citizen of the United States, residing at Rock Island, in the county of Rock Island and State of Illinois, have invented certain new and useful Improvements in Metal Wheels, of which the following is a specification.

This invention relates to metal wheels and has for its object to provide a strong and substantial all metal wheel, light in weight and inexpensive to manufacture, which can be used for various purposes but which is especially adapted for use as a traction wheel.

My invention has relation particularly to a wheel provided with loosely mounted traction shoes adapted to form a track for the wheel and give it proper traction, and the invention has for its object to prevent dirt from accumulating and packing in between the shoes and the rim of the wheel which might interfere with the proper working of the wheel and shoes.

The invention also has other objects which will appear in the detail description of the selected embodiment illustrated in the accompanying drawings in which Fig. 1 is a side elevation, partly in section, showing a wheel embodying my invention.

Figure 1:
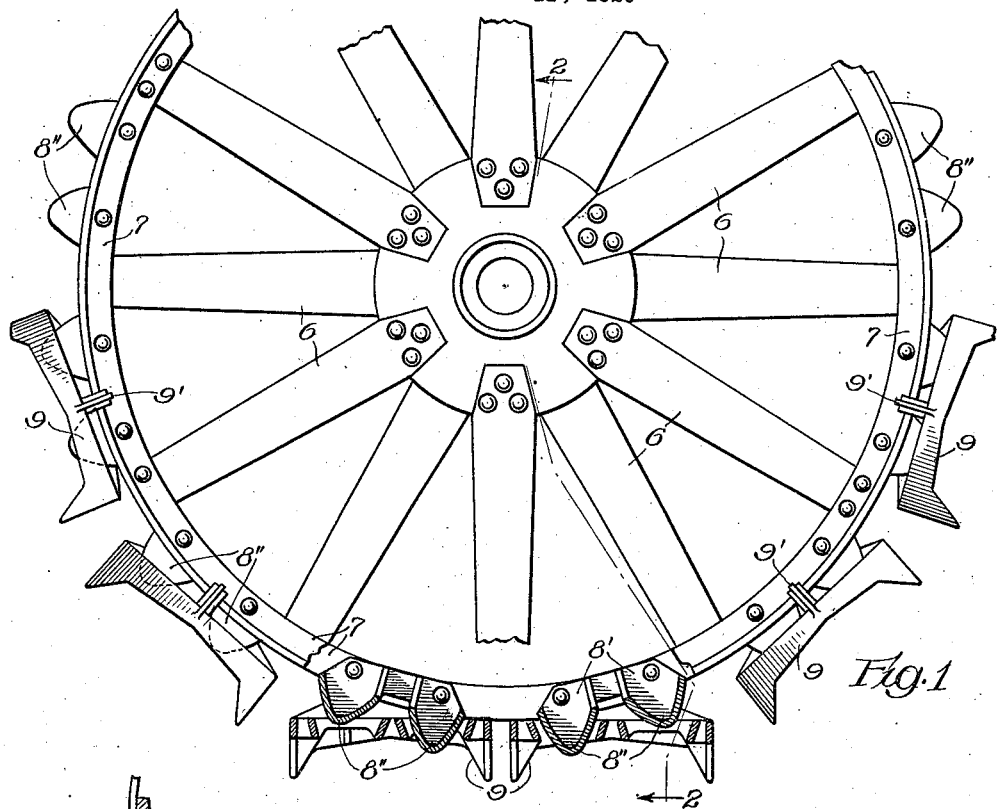
Figure 2:
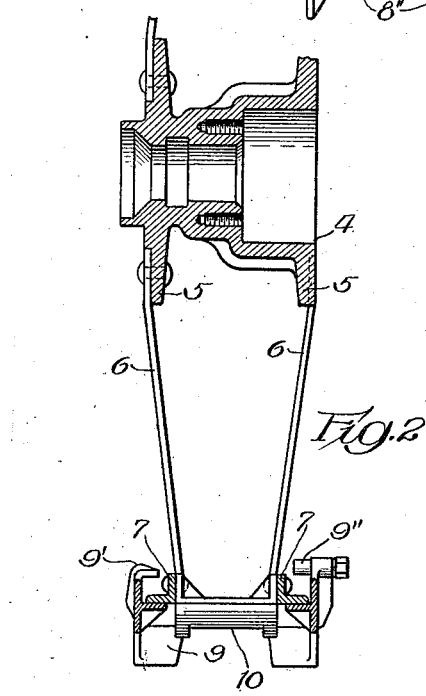
Fig. 2 is a sectional view on the line 2—2 of Fig. 1.
Figure 3:
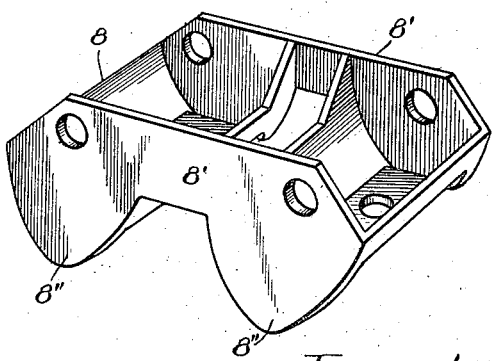
Fig. 3 is a detail enlarged perspective view of one tooth.

Referring to the drawings, the invention comprises a hub 4 of suitable and approved construction provided with peripheral flanges 5 properly spaced apart. Spokes 6, which may be made of flat, metal bars, are fastened in two sets to the flanges 5, preferably in alternate relation as shown in Fig. 1. Angle rings 7 are fastened to the outer ends of the spokes on the outer sides thereof. A plurality of teeth 8 are secured to and between the rings 7 in alternate relation with the spokes and it will be noted that the rings connect the spokes and the teeth connect the rings, securely and rigidly, in an open work construction, which will prevent dirt from accumulating and packing therein. The tooth 8 shown in Fig. 3 may be cast or stamped and is provided with upstanding sides 8' to fit between the upstanding sides of the angle rings 7, and these parts are secured together rigidly by rivets, bolts or other suitable means. The tooth is provided with a pair of prongs 8'' which project beyond the rim of the wheel as constituted by the outer ends of the spokes and the angle rings 7. A suitable traction shoe 9, substantially like that disclosed in my application Serial No. 302,680, filed June 9, 1919, may be loosely engaged with the rim by means of the hook or lip 9' and the bolt 9'' to cooperate with each tooth 8 as indicated in Fig. 1. The shoes are loosely mounted on the rim so that they have a certain freedom of movement thereon, but this movement is limited by the teeth which engage the shoes and retain them in the same general position on the rim. Each tooth is made in the form of a hollow casting or stamping and the prongs are recessed at 10 between their ends so that, if desired, the shoes may be removed and a band arranged over the teeth and within the recesses therein to provide a solid rim which will be useful for some purposes, as in road maintenance work on hard surfaces.

My improved wheel combines great strength with simplicity of construction and at the same time it can be made at comparatively low cost because the parts thereof are readily obtained and easily assembled. The open work construction of the wheel is especially advantageous for traction purposes on soft ground because it will prevent the dirt from accumulating and packing in the wheel and between the shoes and the rim which will prevent the wheel and rim from working properly. The open work construction permits the dirt to fall freely through the wheel and shoes without interfering with the proper operation of the shoes.

I am aware that many changes may be made in the invention as shown in the drawings, particularly in the hub, which may be made in many ways for different purposes and for various reasons. The spokes may be made of round bars instead of flat bars and the hub or the spokes or both may be made of wood for certain purposes, and I reserve the right to make all changes in the form, construction and arrangement of parts as fairly fall within the scope of the following claims:

I claim:

1. A wheel comprising a hub, a pair of rings spaced apart, spokes secured at their inner ends to the hub and at their outer ends to the rings, outwardly projecting teeth located between and connecting the rings at intervals, and traction shoes loosely engaged with said rings in cooperative relation with the teeth.

2. A wheel comprising a hub, a pair of angle rings spaced apart, spokes secured at their inner ends to said hub and at their outer ends to said rings, teeth arranged between said rings at intervals and securing the rings together, said teeth having prongs projecting beyond the periphery of the rings, and traction shoes arranged in cooperative relation with the teeth and having means for loosely engaging them with the rings.

3. A wheel comprising a hub, two sets of spokes secured to said hub and projecting radially from opposite sides thereof, two rings secured to the outer ends of said spokes and spaced apart, teeth located between the rings and between the spokes to secure the rings together, and traction shoes mounted on the rings in cooperative relation with the teeth.

LOUIS E. SLAUSON.